Dec. 12, 1967  G. B. GRAHAM  3,357,588
ROCKET MOTOR CASING

Filed May 18, 1965  2 Sheets-Sheet 1

INVENTOR.
Gilbert B. Graham
BY Edwin O. Grant

ATTORNEY

Dec. 12, 1967   G. B. GRAHAM   3,357,588
ROCKET MOTOR CASING
Filed May 18, 1965   2 Sheets-Sheet 2

INVENTOR.
Gilbert B. Graham
BY Edwin D. Grant

ATTORNEY

United States Patent Office 3,357,588
Patented Dec. 12, 1967

3,357,588
ROCKET MOTOR CASING
Gilbert B. Graham, Santa Barbara, Calif., assignor to Thiokol Chemical Corporation, Bristol, Pa., a corporation of Delaware
Filed May 18, 1965, Ser. No. 456,646
1 Claim. (Cl. 220—10)

ABSTRACT OF THE DISCLOSURE

Rocket casing comprising a cylindrical inner shell, an insulating layer contactingly disposed around said shell and having two edges that extend longitudinally thereof in parallel, circumferentially spaced relation relative to each other, a cover sheet contactingly disposed around said insulating layer and having two edges that extend longitudinally of said shell in parallel, circumferentially spaced relation relative to each other, the longitudinally extending edges of said cover sheet being respectively disposed adjacent the longitudinally extending edges of said insulating layer, a channel of flexible U-shaped cross-section extending longitudinally of said shell, the bight of said channel being disposed outwardly of said shell and the legs of said channel being respectively fixedly secured to said cover sheet adjacent the longitudinally extending edges thereof, and means for resiliently biasing the longitudinally extending edges of said cover sheet toward each other.

---

This invention relates to rocket motors and more particularly to improved thermal insulation for rocket motors.

The high velocity attained by rockets results in aerodynamic heating of their exterior surfaces, which in turn can adversely affect internal components and cause operational failure of the rockets. Consequently, rockets have long been provided with thermal insulation fixedly secured to their exterior walls by means of adhesive or mechanical fastening means such as rivets and the like. It has been found, however, that many of the insulating systems heretofore employed to protect rockets from the effects of aerodynamic heating are inefficient because they make no provision for expansion or contraction of the rocket wall to which they are attached. Hence, insulation that is fixedly secured to the exterior wall of a rocket will often wrinkle, or edges of insulating layers that are normally juxtaposed will be separated. When this wrinkling or separation of the exterior insulation of a rocket occurs, the high velocity air flow over the insulation may tear it away from the rocket wall, which, of course, results in adverse aerodynamic and heating effects that cannot be tolerated. Another problem encountered in the design of rockets is the shielding of electrical or hydraulic conduits that in some rockets extend longitudinally of the rocket casing and are supported thereon. Shields heretofore provided to protect such externally-disposed components have generally been fixedly attached to the casing of the rocket, and the exterior insulation of the rocket either is secured to the casing so that its edges abut the longitudinally-extending sides of said shields or is molded over the exterior surface of said shields. If the exterior insulation only abuts a shield fixedly attached to the rocket casing, a gap between the insulation and shield is likely to develop as the casing expands or contracts, which is undesirable for the reasons previously mentioned. Moreover, if the exterior rocket insulation is placed over a shield and fixedly attached thereto, the insulation is subjected to stress, which can produce tears therein, as the casing expands or contracts. Consequently, there has been a need for an exterior insulation system that will remain in close contact with the exterior surface of a rocket casing and with a shield longitudinally disposed on the surface of said casing.

It is, therefore, a broad object of this invention to provide an improved means for insulating the exterior surface of rockets.

It is another object of this invention to provide a rocket motor casing having improved insulating means that remain in close contact with the exterior surface of said casing even though the wall thereof expands or contracts.

It is an additional object of this invention to provide a rocket motor casing having improved means for holding insulating layers against the exterior surface of said casing and also providing a cover for externally disposed rocket components such as electrical conduits, hydraulic lines, and cables.

These and other objects and advantages of the present invention will become more readily apparent by consideration of the following description of several embodiments of the invention, taken in conjunction with the accompanying drawings in which.

Throughout the specification and drawings, like reference numbers refer to like parts.

Figure 1:
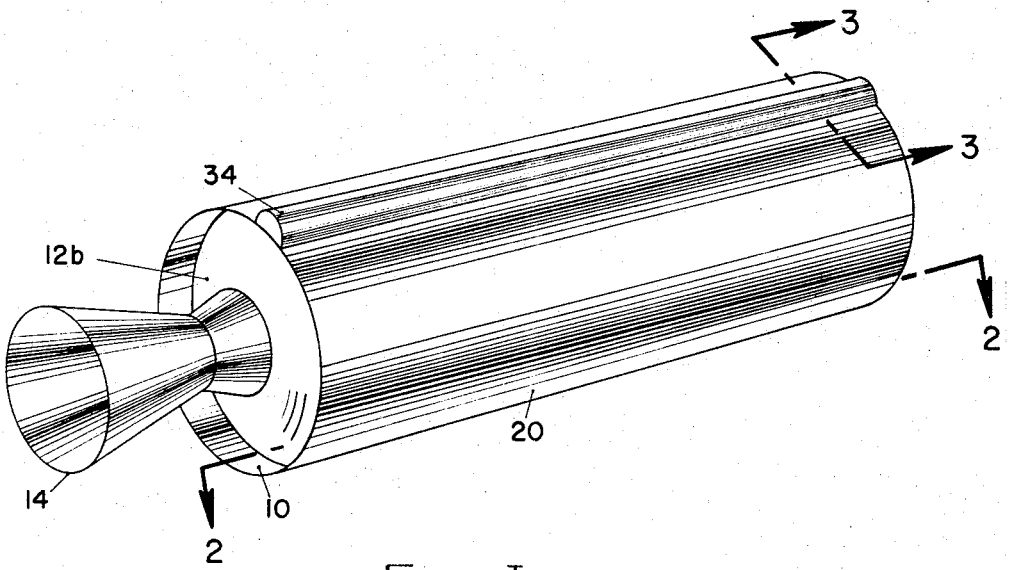
FIGURE 1 is a pictorial representation of a rocket motor casing constructed in accordance with the principles of this invention and constituting a preferred embodiment thereof.

In FIGURE 1 is illustrated a rocket motor comprising a cylindrical casing 10 having dished closure members 12a and 12b (of which only 12b can be seen FIGURE 1) at its forward and aft portions respectively, with a nozzle 14 being connected to said closure member 12b. As can best be seen in FIGURE 2, casing 10 is provided with a unitary insulating layer 16 that is disposed adjacent the exterior surface of the casing over most of its length, said insulating layer being spaced, however, from both the forward end 18a and aft end 18b thereof. Casing 10 is also provided with a cover, generally designated by the number 20, which includes a relatively thick first portion 20a that is disposed adjacent said casing at the surface thereof between its forward end 18a and the forward edge of insulating layer 16, and a second thinner portion 20b that is disposed adjacent insulating layer 16 rearward of the forward edge of said layer. At the forward end of cover 20 is an integral circumferentially-extending, inwardly-projecting shoulder 22 which abuts the forward end 18a of casing 10, and at the rear portion of said cover is a second circumferentially-extending, inwardly-projecting shoulder 23 which abuts the aft end of insulating layer 16 and the exterior surface of casing 10. A propellant 24 is disposed within casing 10.

The insulating layer 16 surrounds casing 10 except at a gap (illustrated in FIGURE 3) between the two edges 26a and 26b thereof that extend lengthwise of said casing, these longitudinal edges being spaced apart in mutually opposed relation in a direction circumferential with respect to casing 10. The longitudinal edges 28a, 28b of cover 20 overlap the longitudinal edges 26a, 26b of insulating layer 16 but are also spaced apart so as to leave a gap therebetween.

Attached to cover 20 by means of a plurality of rivets 30 are two support members 32a, 32b of angular cross-section, one leg of each of said support members being disposed adjacent a respective one of said longitudinal edges 28a, 28b of said cover and coextensive therewith, and the other leg thereof projecting outwardly from said cover. The oppositely disposed sides of a channel 34, generally U-shaped in cross section, are respectively fixedly connected to the outwardly projecting legs of support members 32a, 32b by means of a plurality of bolts 36 spaced along said channel and threadably engaged with gang-nut channels 38a, 38b respectively. Opposite ends of a plurality of tension springs 40 are respectively positioned in holes spaced along each support member 32a, 32b.

It will be recognized that the above-described components of a preferred embodiment of the present invention may be made of a great variety of materials well-known in the art of rockets. Thus casing 10, cover 20 support members 32a, 32b and springs 38 may all be fabricated of alloys of various metals. The insulating layer 16 may also consist of numerous thermal insulating materials such as, for example, a light-weight plastic foam material. For certain rockets, cover 20 and channel 34 may advantageously also be formed of a solid, flexible thermal insulating material, but for other rockets, sheet steel or aluminum alloy may be preferable materials for these components.

After insulating layer 16 has been positioned around casing 10, the cover 20 is placed over said insulating layer and springs 40 are connected to support members 32a, 32b fixed to the longitudinal edges of said cover. Electrical wiring or piping 42 (see FIGURE 3), can be positioned along casing 10 adjacent springs 40, and where necessary connected at various points to components within said casing. Channel 34 is then fastened to support members 32a, 32b by means of bolts 36 and gang-nut channels 38a, 38b, providing a shield for the aforementioned wiring or piping. If casing 10 thereafter expands circumferentially as a result of being heated either by the combustion of a solid propellant disposed therein or by air flow over the surface of cover 20 and resultant heat transfer to said casing, the longitudinal edges 26a, 26b of insulating layer 16 and longitudinal edges 28a 28b of cover 20 will be displaced circumferentially along the surface of casing 10 since the coefficients of expansion of the components are different. Also, if a cryogenic liquid propellant is disposed within casing 10 rather than a solid propellant, the casing will contract when the liquid is placed therein, and the longitudinal edges of insulating layer 16 and cover 20 will shift with respect to the surface of casing 10. However, channel 34, being U-shaped and formed of a flexible material, can flex either outwardly or inwardly, and its sides are resiliently biased toward each other so that they follow the expansion or contraction of cover 20 and at all times maintain a circumferential tension in said cover that holds it tightly against insulating layer 16. Consequently, insulating layer 16 is also held tightly against casing 10, thus eliminating the problem of insulation wrinkling inherent in conventional insulating systems that do not provide for expansion or contraction of a rocket casing. It is thus an efficacious feature of the present invention that channel 34 is capable of flexing in a direction circumferential to casing 10, and that its sides are resiliently biased toward each other by springs 40 connected to the longitudinal edges of cover 20, this arrangement serving the double function of holding insulating layer 16 tightly against casing 10 and providing an enclosed shield in which electrical wiring, hydraulic piping, cables and the like can be conveniently located.

Figure 2:
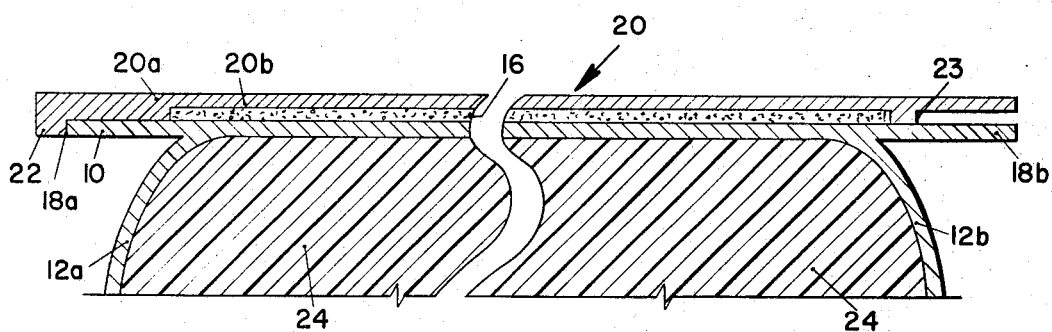
FIGURE 2 is a sectional view of the embodiment of the invention illustrated in FIGURE 1, taken along line 2—2 of that drawing.
Figure 3:
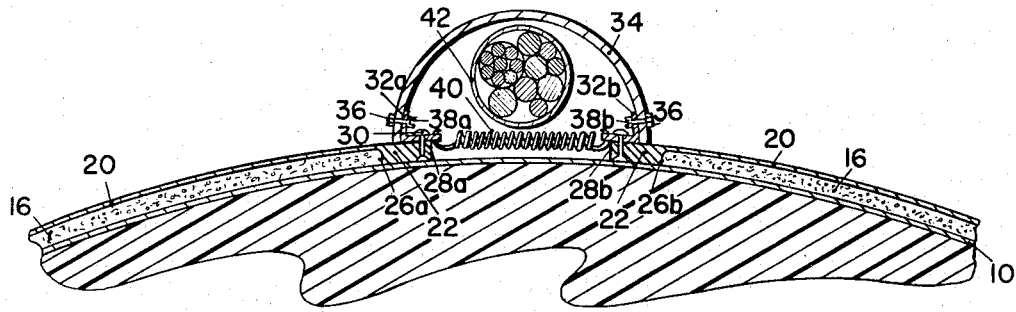
FIGURE 3 is a sectional view of the embodiment of the invention illustrated in FIGURE 1, taken along line 3—3 of that drawing.
Figure 4:
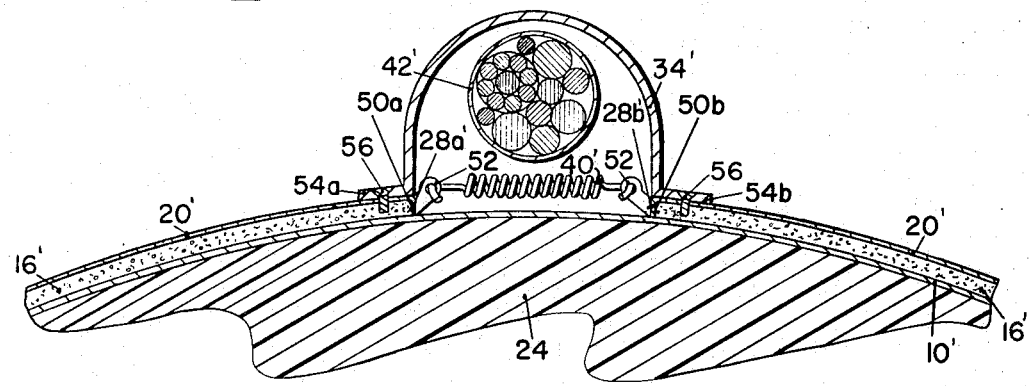
FIGURE 4 is a sectional view of a second embodiment of the invention.
Figure 5:
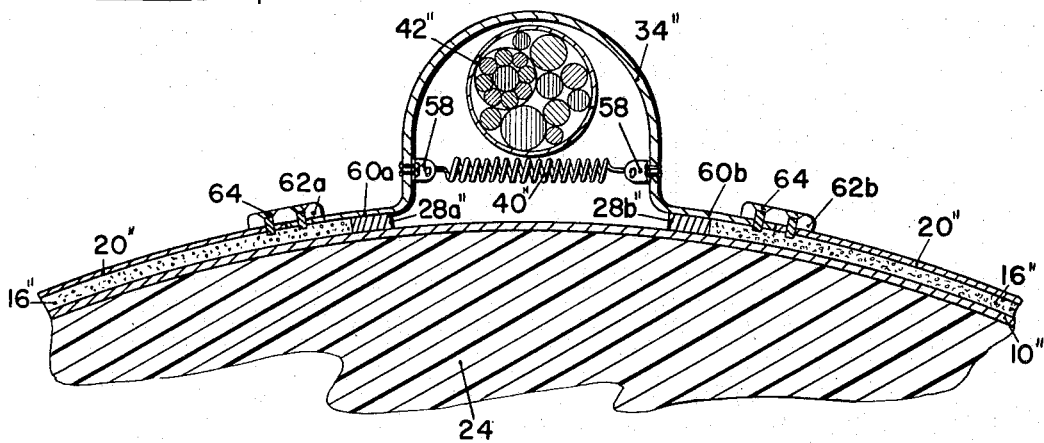
FIGURE 5 is a sectional view of a third embodiment of the invention.

FIGURES 4 and 5 are respectively cross-sectional views of second and third embodiments of this invention corresponding to the sectional view of the above-described preferred embodiment of the invention shown in FIGURE 3, these embodiments differing from the preferred embodiment in details of construction that would not appear in views thereof corresponding to the pictorial view and longitudinal section of said preferred embodiment respectively presented in FIGURES 1 and 2. Therefore, it is to be understood that the construction of the second and third embodiments of this invention is the same as that illustrated for the preferred embodiment in FIGURES 1 and 2, the differences between the embodiments appearing in the cross-sectional views thereof.

The second embodiment of the invention illustrated in FIGURE 4 comprises a casing 10', insulating layer 16', cover 20', channel 34', and a plurality of springs 40' all of which correspond to components of like numeral designation in the preferred embodiment of the invention hereinbefore described. Cover 20' is provided with an integral, inwardly projecting shoulder 50a, 50b at each longitudinal edge thereof. This shoulder extends from a first portion of cover 20' that is disposed adjacent casing 10' (i.e., a portion of cover 20' that corresponds to the first portion 20a of cover 20 of the preferred embodiment illustrated in FIGURE 2) to a circumferentially-extending, inwardly-projecting shoulder located at the aft portion of cover 20' (i.e., a shoulder that corresponds to shoulder 23 of the preferred embodiment illustrated in FIGURE 2). The space between cover 20' and casing 10' is thus completely enclosed and may, in some applications of the invention, be filled with insulating material in particle form. If such insulation is employed in the second embodiment of the invention, the longitudinal edges of insulating layer 16' are defined, for the purpose of interpretation of the claims presented hereinafter, as the boundaries of said insulation adjacent the interior surfaces of shoulders 50a, 50b respectively. A plurality of lugs 52 are fixedly attached in spaced relation along each shoulder 50a, 50b, and a plurality of springs 40' are respectively connected between opposed pairs of these lugs. Each of the oppositely disposed sides of a flexible channel 34', V-shaped in cross section, includes a longitudinally extending flange 54a, 54b that is secured to cover 20' by means of a plurality of screws 56. Channel 34' is coextensive with the longitudinally disposed edges of cover 20'. It will be seen that the sides of channel 34' are resiliently biased toward each other by springs 40', and cover 20' is consequently held tightly against insulating layer 16', and the latter tightly against cover 10', irrespective of expansion or contraction of said cover. Thus the objects of the invention are also accomplished by the second embodiment of the invention.

The third embodiment of the invention illustrated in FIGURE 5 is identical to the preferred embodiment illustrated in FIGURES 1, 2 and 3 except that it comprises a channel 34" that is provided with a plurality of lugs 58 fixedly attached in longitudinally spaced relation to the interior wall thereof, a plurality of tension springs 40" being respectively connected to opposed pairs of said lugs to resiliently bias the sides of said channel toward each other. Channel 34" also has relatively wide longitudinally extending flanges 60a, 60b respectively integrally formed on each side thereof. These flanges 60a, 60b are fixedly secured to cover 20' of the embodiment by means of splice plates 62a, 62b respectively and a plurality of screws 64 engaged with both said splice plates and cover. Channel 34" may in some cases be integrally formed with cover 20" or joined thereto by welding. It will be recognized that the construction of the third embodiment of the invention provides the same advantages hereinbefore stated in connection with the description of the preferred and second embodiments of the invention.

As other modifications of the three embodiments described and illustrated herein can be made within the scope of the invention, the foregoing detailed description is not to be considered as limitative except in the light of the appended claim.

What is claimed is:

A rocket motor casing comprising a cylindrical inner shell, an insulating layer contactingly disposed around said shell and having two edges that extend longitudinally thereof in parallel, circumferentially spaced relation relative to each other, a cover sheet contactingly disposed around said insulating layer and having two edges that extend longitudinally of said shell in parallel, circumferentially spaced relation relative to each other, said longitudinal edges of said cover sheet being respectively disposed adjacent said longitudinal edges of said insulating layer, a channel of flexible U-shaped cross section extending longitudinally of said shell and spanning the space between the longitudinal edges of the cover sheet, the bight of said channel being disposed outwardly of said shell and each of the legs of said channel being respectively fixedly secured to said cover sheet adjacent and paralleling said longitudinal edges thereof, and biasing means for resiliently biasing said longitudinal edges of said cover sheet toward each other, said biasing means being disposed within the interior of said channel and extending across the space between said longitudinal edges of said cover sheet.

References Cited

UNITED STATES PATENTS

| | | | |
|---|---|---|---|
| 1,186,572 | 6/1916 | Guibert | 220—9 |
| 1,907,307 | 5/1933 | Smith | 138—14 |
| 2,181,074 | 11/1939 | Scott | 220—9 |
| 2,323,297 | 7/1943 | Collins | 220—9 |
| 2,705,208 | 3/1955 | Schweikert | 220—9 |
| 2,719,099 | 9/1955 | Holbrook | 220—9 |
| 2,983,401 | 5/1961 | Murphy | 220—9 |
| 3,073,475 | 1/1963 | Fingerhut | 220—3 |
| 3,115,982 | 12/1963 | Marrison | 220—4 |
| 3,224,623 | 12/1965 | Knox et al. | 220—9 |

THERON E. CONDON, *Primary Examiner.*

JAMES R. GARRETT, *Examiner.*